United States Patent [19]
Otto

[11] Patent Number: 5,454,647
[45] Date of Patent: Oct. 3, 1995

[54] SEAL FOR PACKAGE BEARING

[75] Inventor: Dennis L. Otto, Malvern, Ohio

[73] Assignee: The Timken Company, Canton, Ohio

[21] Appl. No.: 247,758

[22] Filed: May 20, 1994

[51] Int. Cl.[6] .................................................. F16C 33/78
[52] U.S. Cl. ............................ 384/486; 277/95; 384/484
[58] Field of Search ............................... 384/477, 481, 384/482, 484, 485, 486, 544, 589; 277/95, 38

[56] References Cited

U.S. PATENT DOCUMENTS

| | | | |
|---|---|---|---|
| 3,531,168 | 9/1970 | Bainard . | |
| 3,936,105 | 2/1976 | Asberg | 384/482 |
| 3,944,305 | 3/1976 | Asberg . | |
| 4,043,620 | 8/1977 | Otto . | |
| 4,118,080 | 10/1978 | Fregler et al. . | |
| 4,217,007 | 8/1980 | Filippa | 384/484 X |
| 4,402,558 | 9/1983 | Olschewski et al. . | |
| 4,647,230 | 3/1987 | Friedrich et al. | 384/486 X |
| 5,022,659 | 6/1991 | Otto | 277/1 |
| 5,037,214 | 8/1991 | Dougherty | 384/571 |

FOREIGN PATENT DOCUMENTS 286151  12/1988  European Pat. Off. ............... 384/486

*Primary Examiner*—Thomas R. Hannon
*Attorney, Agent, or Firm*—Polster, Lieder, Woodruff & Lucchesi

[57] ABSTRACT

A package bearing includes outer and inner rings, provided with opposing raceways, and rolling elements located between the raceways. The inner ring has a flange which projects outwardly past one end of the outer ring and is provided with a radially directed sealing surface that is located opposite the end of the outer ring. Here the outer ring is fitted with a seal including a case that is pressed over the outer surface of the outer ring and an elastomeric seal element having lips that bear against the sealing surface on the flange of the inner ring to establish a dynamic fluid barrier. The case surrounds the seal element to protect it from stone impingement. The seal is large enough to pass over the nearby set of rolling elements in the bearing and thus does not interfere with assembly of the bearing.

21 Claims, 2 Drawing Sheets

1

SEAL FOR PACKAGE BEARING

BACKGROUND OF THE INVENTION

This invention relates in general to seals and more particularly to a seal for an antifriction bearing.

Packaged wheel bearings have enjoyed widespread acceptance amongst automobile manufacturers, particularly for front wheel drive automobiles, in that they relieve the automobile manufacturers of several time-consuming assembly operations. On the assembly line, a worker at one station secures a packaged bearing to the suspension system of an automobile under assembly, while a worker at a later station attaches a road wheel to the bearing assembly. The bearing manufacturer actually assembles the packaged bearing, which saves work on the automobile assembly line and, more importantly, relieves the automobile manufacturer of adjusting the bearing. Indeed, the package bearing comes preset with a desired end play or preload.

Like any bearing that operates in a hostile environment of dirt, road chemicals, and water, a package bearing has seals to protect critical surfaces within it from contaminants and to retain grease. But packaged wheel bearings are very compact, and many do not have space to accommodate traditional seals.

The present invention resides in a seal which is highly compact and operates as a face seal in an extremely confined region of an antifriction bearing, which may be a package bearing. The seal has a case which fits over one bearing ring to establish a static barrier along that ring and an elastomeric seal element which bears against a radial sealing surface on another bearing ring serving to establish a live fluid barrier along that surface. The seal thus closes one end of the bearing interior. The case surrounds the seal element and protects it from stone impingement. The invention also resides in the seal in combination with a bearing assembly.

DESCRIPTION OF THE DRAWINGS

In the accompanying drawings which form part of the specification and wherein like numerals and letters refer to like parts wherever they occur.

DETAILED DESCRIPTION

Figure 1:
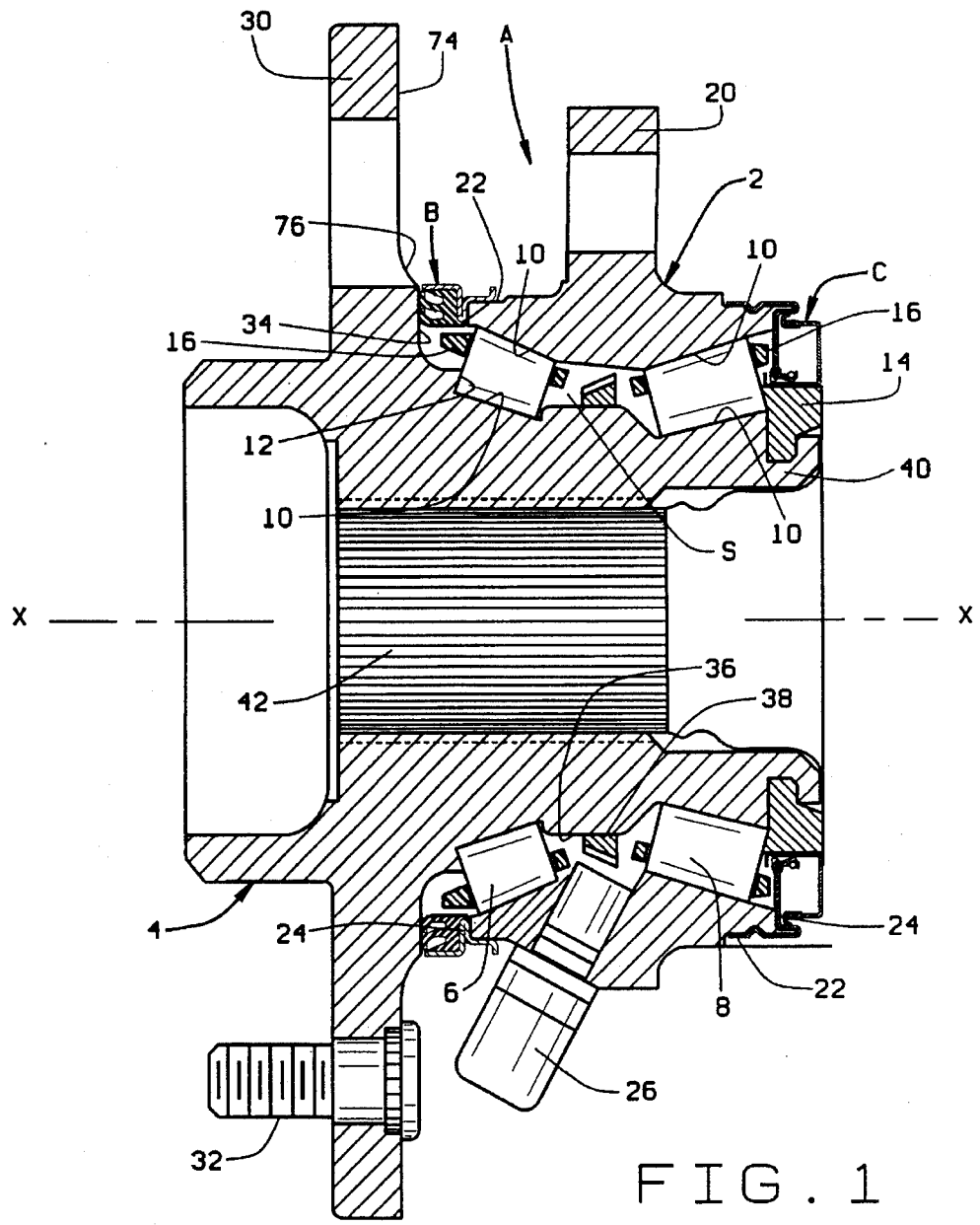
FIG. 1 is a sectional view of a packaged bearing provided with a seal embodying the present invention.

Referring now to the drawings, a package wheel bearing A (FIG. 1) serves to couple a road wheel to the suspension system of an automotive vehicle, enabling the road wheel to rotate relative to the suspension system about an axis X. The bearing A, being an antifriction bearing, has an annular interior or space S within which critical surfaces exist. To protect these surfaces, the space S contains a lubricant, such as grease. The annular interior S is isolated from the surrounding environment by two seals B and C, one being at each of its ends. By establishing fluid barriers, the seals prevent contaminants from entering the space S and likewise prevent the lubricant from escaping. The seal B, which is the smaller of the two, represents the essence of the present invention. The seal C is a variation of the seal disclosed in U.S. Pat. No. 5,022,659.

Basically, the bearing A includes (FIG. 1) an outer ring 2 which attaches to the suspension system of a vehicle and an inner ring 4 to which the road wheel is attached. The annular space S of the bearing exists between the two rings 2 and 4, and here the bearing A has rolling elements in the form of tapered rollers 6 that lie in an outboard row and tapered rollers 8 that lie in an inboard row. To accommodate the rollers 6 and 8, the rings 2 and 4 have opposing raceways 10 which taper downwardly from the ends of the annular space S, so that their large diameter ends are presented toward the ends of the annular space S and their small diameter ends toward the center of the space S. The tapered raceways 10 on the outer ring 2 simply run out to the ends of the ring 2. The inner ring 4, on the other hand, has an integral thrust rib 12 at the large end of its outboard raceway 10 and separate rib ring 14 at the large end of its inboard raceway 10, the latter being captured on the inner ring 4. The rollers 6 of the outboard row have their tapered side faces along and against the raceways 10 at the outboard end of the annular space S and their large end faces against the thrust rib 12. The rollers 8 of the inboard row have their tapered side faces against the raceways 10 at the inboard end of the space S, with their large end faces being against the rib ring 14. The rollers 6 and 8 are on apex, meaning that if each were extended to its apex, the apex would be along the axis X. This geometry imparts small axially directed forces to the rollers 6 and 8, and those forces would expel the rollers 6 and 8 from the space S were it not for the rib 12 and rib ring 14. The rollers 6 and 8 are confined by cages 16 which maintain the proper spacing between them.

The outer ring 2, generally midway between its ends, has a flange 20 (FIG. 1) which is designed to fit against a suspension system component, such as a strut, and to receive bolts for securing the ring 2 to the component. At each of its ends, the outer ring 2 has a machined cylindrical surface 22 which is presented outwardly away from the axis X and an end face 24 which extends radially between the cylindrical surface 20 and the large end of the raceway 10 at that end. The outer ring 2 carries a speed sensor 26 which projects through the ring 2 into the annular space S, its inner end being between the two rows of rollers 6 and 8.

The inner ring 4 has a flange 30 which projects radially beyond the outboard end of the outer ring 2 to provide a mounting for a road wheel. Indeed, the flange 30 is fitted with threaded studs 32 which hold the road wheel against the flange 30 and on the inner ring 4. The flange 30 emerges from the ring 4 slightly beyond the thrust rib 12 where it is provided with a sealing surface 34 that faces, yet is spaced from, the end face 24 at the outboard end of the outer ring 2. The sealing surface 34 extends radially and is machined to a smooth finish. Between its two raceways 10, the inner ring 4 has a raised surface 36 over which a tone or encoder ring 38 fits. The outwardly presented surface of the ring 38 moves past and in close proximity to the end of the speed sensor 26 as the inner ring 4 rotates relative to the outer ring 2, and is configured to excite the sensor 26 such that the sensor 26 produces a pulsating signal, the frequency of which reflects the angular velocity of the ring 4. At its inboard end the inner ring 4 has an extension 40 which is initially directed axially so that it will fit through the rib ring 14, but once the rib ring 14 is installed, the extension 40 is turned radially outwardly to capture the rib ring 14 on the inner ring 4. Within its interior the inner ring 4 is provided with splines 42 to couple the ring 4 with a drive shaft that transmits torque to it.

The outboard seal B (FIG. 1) fits over the cylindrical surface 22 and against the end face 24 on the outboard end of the outer ring 2. It establishes a live or dymnamic fluid barrier along the sealing surface 34 of the inner ring 2, and thereby closes the outboard end of the annular space S, all without significantly impeding rotation of the inner ring 4. The inboard seal C fits over the cylindrical surface 22 at the outboard end of the outer ring 2 and over rib ring 14 that is captured on the inboard end of the inner ring 4. It likewise establishes live or dynamic fluid barriers—indeed several but—they are within the seal itself. As such, the seal C closes the inboard end of the annular space S.

To assemble the package bearing A, one places the outboard rollers 6 along with their cage 16 around the outboard raceway 10 of the inner ring 4. Then the outer ring 2, with the outboard seal B in place, is advanced over the inner ring 4 until its outboard raceway 10 seats over the rollers 6 that lie around the inner ring 4. Next the inboard rollers 8 and their cage 10 are advanced axially as a unit into the space S between the inboard raceways 10 for the two rings 2 and 4, followed by the rib ring 14 which is moved over the axial extension on the inner ring 2. With the rib ring 14 held fast, one determines the setting of the bearing A as so configured, and if that setting is not suitable, the rib ring 14 is removed and ground to provide the desired setting. Once the bearing A has the proper setting, the extension 40 is turned outwardly to capture the rib ring 14 on the inner ring 4. Finally, the inboard seal C is installed over the outer ring 2 and rib ring 14. The installation procedure is described in more detail in pending U.S. patent application Ser. No. 08/193,708 of J. Dougherty, filed Feb. 9, 1994, and entitled Package Bearing.

Figure 2:
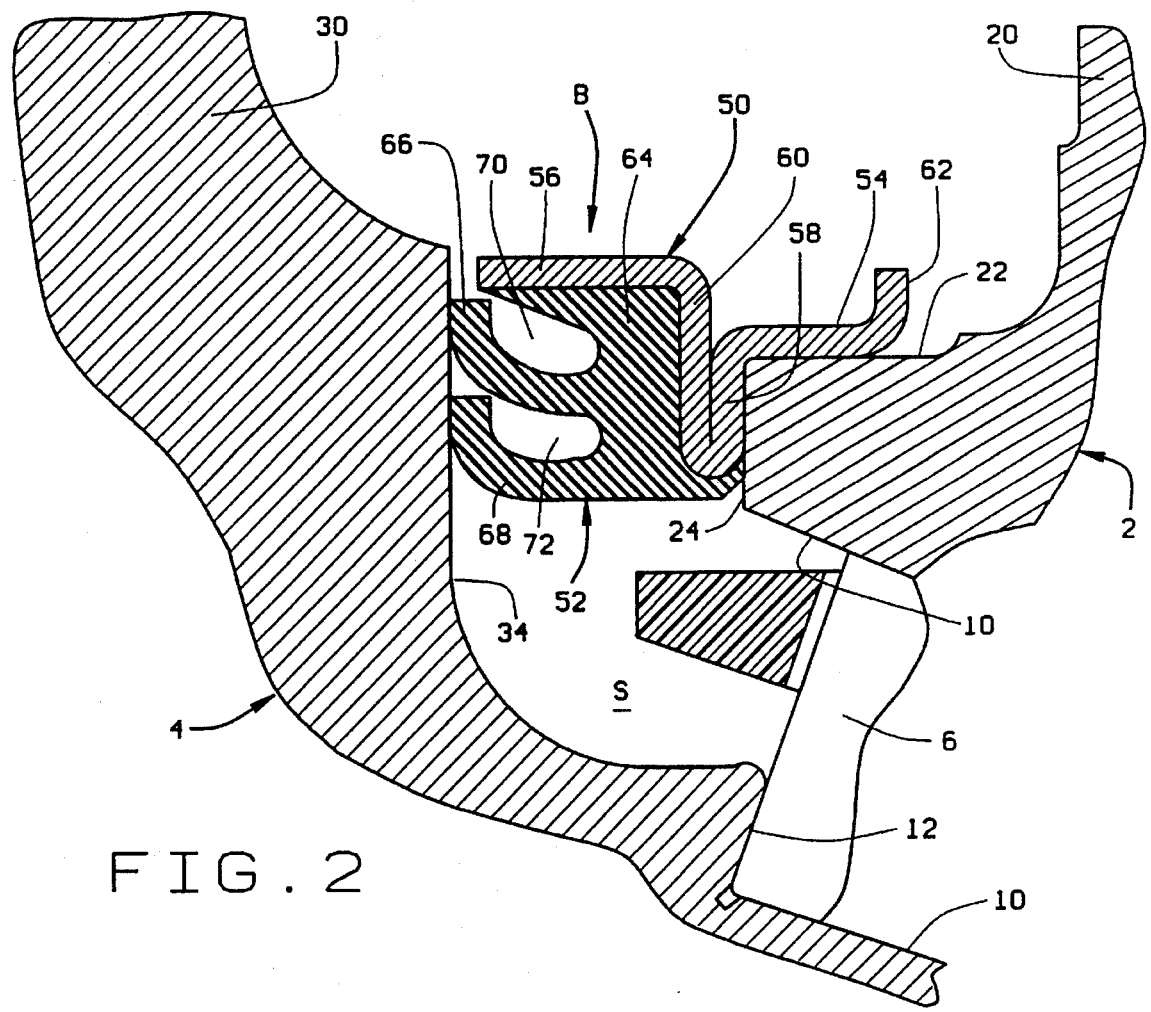
FIG. 2 is an enlarged sectional view of the seal in the bearing.

Turning now to the outboard seal B, it consists of (FIG. 2) a seal case 50, which is formed from a generally rigid substance, preferably as a metal stamping, and an elastomeric seal element 52 which is bonded to the case 50. The seal case 50 fits onto the outer ring 2 with which it establishes a static fluid barrier. The seal element 52, owing to its elastomeric constituency, is somewhat flexible, and it bears against the sealing surface 34 on the inner ring 4 to establish a live or dynamic fluid barrier along that surface.

The seal case 50 has (FIGS. 2 & 3) small and large axial walls 54 and 56 and two radial walls 58 and 60 connecting the axial walls 54 and 56. To this end, the small axial wall 54 at one of its ends merges into the radial wall 58 at a 90° radius. Likewise the large axial wall 56 at one of its ends merges into the radial wall 60 at another 90° radius. The two radial walls 58 and 60 lie against or in close proximity to each other, but in any event face each other and merge at a 180° radius that is located radially inwardly from the 90° radii at which the radial walls 58 and 60 are joined to their respective axial walls 54 and 56. Thus, the radial walls 58 and 60 project inwardly toward the axis X from the axial walls 54 and 56. At its opposite end, the small axial wall 54 merges into an outwardly directed flange 62 at still another 90° radius. The flange 62 is quite short, projecting outwardly no farther than about the envelope of the large axial wall 56.

The small axial wall 54 of the case 50 fits over (FIG. 2) the cylindrical surface 22 at the outboard end of the outer ring 2 with an interference fit. Indeed, the wall 54 is advanced over the surface 22 until the radial wall 58 at its end comes against end face 24 at the outboard end of the outer ring 2. The friction of the interference fit fixes the case 50 firmly in position on the outer ring 2 and further establishes a static fluid barrier between the case 50 and ring 2. The radial wall 58 is shorter than the end face 24 on the outer ring 2, and as a consequence the 180° radius between the two radial walls of the case 50 lies outwardly beyond the large end of the outboard raceway 10 for the outer ring 2. The large axial wall 56 projects axially toward the sealing surface 34 on the flange 30 of the inner ring 4 and terminates close to the surface 34, so that a small gap exists between the end of the axial wall 56 and the sealing surface 34. Preferably, the gap is about 0.03 inches wide.

The seal element 52 includes (FIGS. 2 & 3) a base 64 that lies along the large axial wall 56, the radial wall 58 and even the 180° radius of the case 50. Indeed, the seal element 52 along its base 64 is bonded to the inner surfaces of the axial wall 56 and radial wall 60, that is, to the surfaces which lead up to the interior corner formed by those walls 56 and 60, and is also bonded to the convex surface of the 180° radius, these surfaces being covered in their entireties by the base 64. In addition, the seal element 52 has two seal lips 66 and 68 which project generally axially from, yet are formed integral with, the base 64. In order to provide a measure of length and flexibility to the lips 66 and 68, an annular groove 70 exists between the outer regions of the base 64 and the first lip 66 and another annular groove 72 of equivalent depth exists between the two lips 66 and 68. Indeed, the inner or closed ends of the two grooves 70 and 72 lie about midway between the ends of the large axial wall 56.

Figure 3:
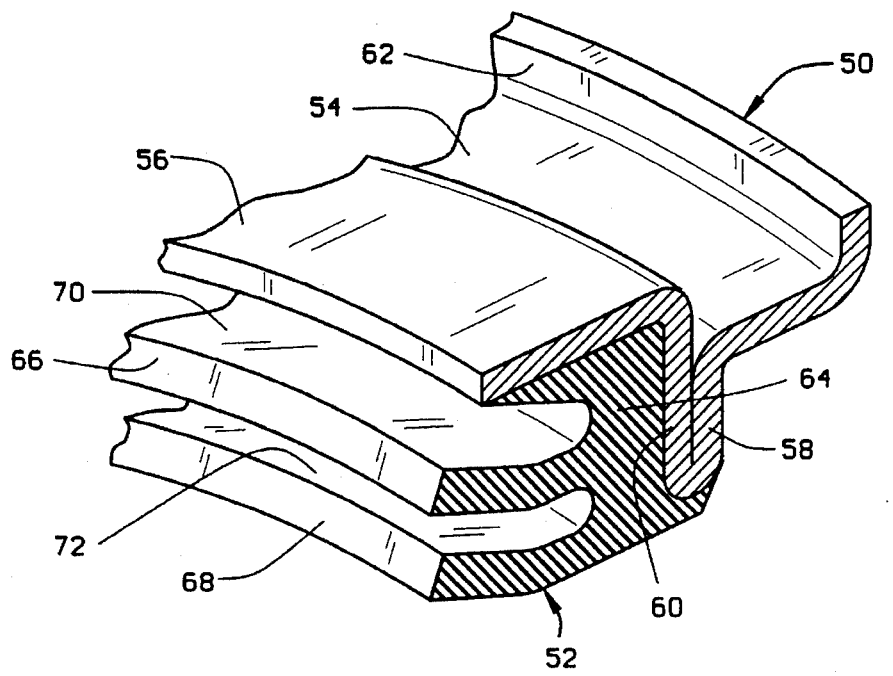
FIG. 3 is a fragmentary perspective view of the seal.

The lips 66 and 68 initially project axially for a short distance beyond the base 64 and then turn slightly outwardly, so that the major portion of each lip 66 and 68 lies slightly oblique to the axis X, at least when the lips 66 and 68 are unrestrained (FIG. 3). Moreover, each lip 66 and 68, when unrestrained, projects axially beyond the end of the large axial wall 56 a distance greater than the gap that exists between the end of the wall 56 and the sealing surface 34. As a consequence, the lips 66 and 68 come against the sealing surface 34 during the assembly of the bearing A and deflect outwardly (FIG. 2), and they remain in that outwardly deflected condition during the operation of the bearing A. Yet, by reason of the natural resiliency of the elastomer from which they are formed, the lips 66 and 68 are biased against the sealing surface 34. Thus, as the inner ring 4 rotates the lips 66 and 68 bear against the sealing surface 34 which moves along them. The two regions of contact—one for each lip 66 and 68—create barriers which prevent the ingress of contaminants into the annular space S and the escape of lubricant from that space S. The large axial wall 56 of the seal case 50 encircles the seal element 52 and protects it from debris, such as rocks, which may be thrown up from the road surface by the road wheel that rotates on the bearing A.

During the assembly of the bearing A, the outer ring 2 is advanced axially over the inner ring 4 and seated along its outboard raceway 10 against the outboard rollers 6, but before this assembly step is undertaken one must install the outboard seal B on the outer ring 2. To this end, one aligns the small axial wall 54 of the seal case 50 with the cylindrical surface 22 at the outboard end of the outer ring 2. Then a split ring, while open, is fitted around the small axial wall 54, and closed so that it lies between the short flange 62 and the portion of the radial wall 60 that lies beyond the small axial wall 54. With the split ring closed around the small axial wall 54 of the case 50, one exerts an axially directed force on the ring which in turn transmits the force to the short flange 62 of the case 50. The force advances the small axial wall 54 over the cylindrical surface 22 on the outer ring 2, and in so doing overcomes the friction that derives from the interference fit. In any event, the seal case 50 advances until its radial wall 58 encounters the outboard end face 24 on the outer ring 2. Since both the case 50 and the seal element 52 of the outboard seal B lie beyond the large end of the tapered outboard raceway 10 on the outer ring 2, the seal B passes over the outboard rollers 6 during the assembly of the bearing B without flexing the seal element 52. In short, the seal B does not interfere with the assembly of the bearing A.

The split ring, which is used to install the seal B on the outer ring 2, may also be used to remove the seal B from the outer ring 2. To do so, one places it along the opposite face of the flange 62, that is between the flange 62 of the case 50 and the flange 20 of the outer ring 2. An axially directed force exerted against the flange 62, if of sufficient magnitude, will overcome the friction between the small axial wall 54 and the cylindrical surface 22 of the outer ring 2 and separate the seal B from the ring 2.

The seal B provides a highly effective barrier at the outboard end of the annular space S, retaining the lubricant in that space and thwarting the ingress of contaminants, such as water, dirt and road chemicals. Yet the seal B is highly compact and does not interfere with the assembly of the bearing B.

Figure 4:
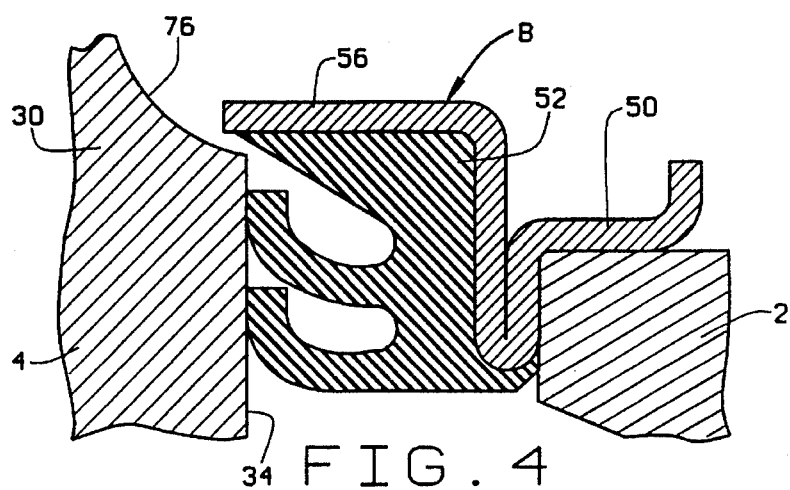
FIG. 4 is a fragmentary sectional view of the bearing showing the seal in a slightly modified configuration.

The seal B may assume a slightly modified configuration (FIG. 4). In this regard, the flange 30 of the inner ring 4 has a major back face 74 which, like the sealing surface 34, lies in a plane perpendicular to the axis X. But the back face 74 and the sealing surface 34 are offset slightly, and are connected by a beveled intervening surface 76. In the modified configuration of the seal B, the large axial wall 56 of the seal case 50 lies beyond the sealing surface 34, that is to say, its diameter is greater than the peripheral diameter of the sealing surface 34. Moreover, the axial wall 56 projects axially beyond the sealing surface 34 and at its end overlies the beveled surface 76, there being a gap of about 0.03 inches between the two. The seal element 52 which is bonded to substantially the entire inside surface of the axial wall 56, is quite thin at the free end of the wall 56 and does not interfere with the flange 30.

This invention is intended to cover all changes and modifications of the example of the invention herein chosen for purposes of the disclosure which do not constitute departures from the spirit and scope of the invention.

What is claimed is:

1. An annular seal having an axis and comprising: a relatively rigid case having first and second generally axial walls and at least one generally radial wall interposed between the axial walls, with the arrangement being such that the axial walls protect in opposite directions beyond the radial wall and the radial wall lies closer to the axis than both axial walls, the second axial wall and the radial wall having inner surfaces which form within the case an interior corner which is presented inwardly toward the axis; and a flexible seal element having a base and at least one lip, the base being attached to the second axial wall and the radial wall of the case along the inner surfaces thereof that form the inside corner, the lip projecting generally axially from the base and away from the radial wall of the case.

2. A seal according to claim 1 wherein the seal element includes a groove which lies between the lip and a portion of the base that is along the second axial wall.

3. A seal according to claim 1 wherein the case includes another generally radial wall; wherein said one radial wall and the other radial wall are joined together such that they face each other; and wherein the first axial wall is connected to and projects from the other radial wall.

4. A seal according to claim 3 wherein the radial walls are joined at a substantially 180° radius so that the two radial walls lie in very close proximity to each other.

5. A seal comprising: a relatively rigid case having first and second axial walls and at least one radial wall interposed between the axial walls, the second axial wall and the radial wall having inner surfaces which form an interior corner in the case; and a flexible seal element having a base and at least one lip, the base being attached to the second axial wall and the radial wall of the case along inner surfaces thereof that form the inside corner, the lip projecting generally axially from the base and away from the radial wall of the case, the base and at least a portion of the lip for the seal element being surrounded by the second axial wall of the case, the base of the seal element being attached to the second axial wall of the case along substantially the entire inner surface of that wall, the seal element further including a groove which lies between the lip and a portion of the base that is along the second axial wall.

6. A seal according to claim 5 wherein the seal element is attached to the case along substantially the entire inner surface of the radial wall.

7. A seal according to claim 6 wherein radial wall is one of two radial walls, the one being connected to the second axial wall and the other to the first axial wall, and the two radial walls lie in close proximity to and face each other.

8. A seal according to claim 7 wherein the two radial walls are joined at a 180° radius that forms a convex surface, and the base of the seal element is also attached to the convex surface.

9. A seal according to claim 6 wherein the lip is one of at least two lips, and the lips are separated by another groove in the seal element.

10. A seal according to claim 6 wherein the lip, when unrestrained, project axially beyond the end of the second axial wall of the seal case.

11. In combination with an outer bearing ring having a raceway and an axially directed surface; an inner bearing ring located in part within the outer ring and having a raceway presented toward, but spaced from, the raceway of the outer ring, whereby an annular space exists between the raceways of the two rings, the inner ring also having a flange which projects outwardly past the end of the outer ring and has a generally radially directed sealing surface presented toward the end of the outer ring; and rolling elements located in the annular space between the rings and along the raceways for enabling one ring to rotate with respect to the other ring with minimum friction; an improved seal for closing an end of the annular space between the rings, said seal comprising: a case having first and second axial walls and at least one radial wall between the first and second axial walls, the first axial wall being fitted to the outer ring such that a static barrier exists between the outer ring and the case, the second axial wall being joined to the first wall and extending generally axially toward the flange of the inner ring, the radial wall and the second axial wall forming an inside corner on the case and having inside surfaces that lead up to the corner; and an elastomeric seal element having a base bonded to the inside surfaces of the second axial wall and radial wall of the case and a flexible lip extended from the base, the lip contacting the sealing surface on the flange of the inner ring and establishing a dynamic fluid barrier along the sealing surface, whereby the annular space between the rings is closed at its end.

12. The combination according to claim 11 wherein the first wall has a diameter different than the diameter of the second wall.

13. The combination according to claim 11 wherein the base of the seal element is bonded to the second axial wall of the seal case along substantially the entire inner surface of that wall.

14. The combination according to claim 13 wherein the base of the seal element is bonded to the radial wall along substantially the entire inner surface of the radial wall.

15. The combination according to claim 11 wherein the radial wall of the case is one of two radial walls in the case, the other being joined to the first axial wall, and the two radial walls are connected and presented face-to-face.

16. The combination according to claim 15 wherein the first axial wall of the case fits over the outer ring and the other radial wall of the case lies against the end of the outer ring.

17. The combination according to claim 16 wherein the case also has a flange directed outwardly from the first axial wall for providing a surface against which an axially directed force may be applied to the seal.

18. The combination according to claim 11 wherein seal element contains a groove which lies between the lip and the portion of the base that is bonded to the second axial wall.

19. The combination according to claim 18 wherein the lip projects beyond the end of the second axial wall and is deflected radially outwardly by the sealing surface.

20. The combination according to claim 11 wherein the smallest diameters of the seal case and seal element are at least as great as a circle defined by the outermost surfaces of the rolling elements, so that the seal will pass over the rolling elements when the outer ring is installed over the inner ring and rolling elements.

21. The combination according to claim 11 wherein the flange of the inner ring has a beveled surface located beyond its sealing surface, and the second axial wall of the case at its end overlies the beveled surface of the flange.

* * * * *